B. F. SMITH.
FISH AND OTHER TRAPS.

No. 189,805. Patented April 17, 1877.

Witnesses
Saml. J. Van Stavoren
Jno. F. McNamara

Inventor
Benjamin F. Smith
By Connoly Bros,
Attorneys

UNITED STATES PATENT OFFICE.

BENJAMIN F. SMITH, OF PHILADELPHIA, PENNSYLVANIA, ASSIGNOR OF ONE-HALF HIS RIGHT TO WILLIAM K. BOWMAN, OF SAME PLACE.

IMPROVEMENT IN FISH AND OTHER TRAPS.

Specification forming part of Letters Patent No. 189,805, dated April 17, 1877; application filed August 16, 1876.

*To all whom it may concern:*

Be it known that I, BENJAMIN F. SMITH, of Philadelphia, in the county of Philadelphia, and State of Pennsylvania, have invented certain new and useful Improvements in Devices for Catching Fish and Game; and I do hereby declare the following to be a full, clear, and exact description of the invention, such as will enable others skilled in the art to which it pertains to make and use it, reference being had to the accompanying drawings, which form part of this specification, in which—

Figure 1:
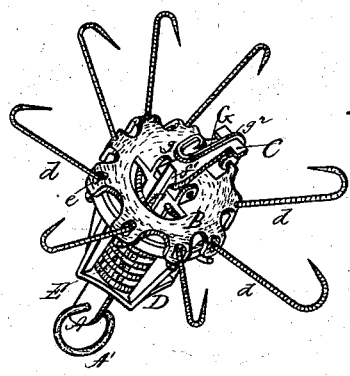
Figure 2:
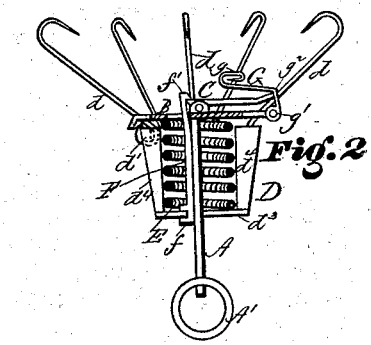
Figure 3:
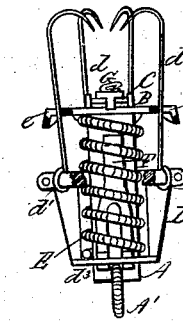

Figure 1 is a perspective view of the device set. Fig. 2 is a vertical section of same in like position. Fig. 3 is a vertical section of device closed or sprung.

My invention consists in the peculiar construction and combination of parts as hereinafter more fully set forth.

Referring to the accompanying drawing, A is a sliding shank or bar terminating in a disk, B, in the center of which is pivoted a latch, C. $d\ d$ are hooks, secured at $d^1$ to the lower ring of a crown, D, and passing through openings $e$ in the disk B. Said crown D is composed of the ring $d^2$, disk $d^3$, and connecting-ribs $d^4$, said disk $d^3$ having an oblong slot for the passage of the shank A. E is a spiral spring surrounding the shank A, and having a tendency to push the disk B in the direction of the points of the hooks $d\ d$, and cause the latter to close, as shown in Fig. 3. F is a bar or dog, fastened, as shown at $f$, to the disk $d^3$, and provided with a lip, $f'$, which engages with the short end of the latch C when the device is set, as shown in Fig. 2. G is the bait-holder, terminating in a hooked end, $g$, being pivoted at its opposite extremity, $g^1$, to the disk B. Said holder is bent to form an angle at $g^2$, so as to engage with the latch C, as shown plainly in Figs. 1 and 2 of the drawing.

To set the trap, compress the spring by bringing the disk B and ring $d^2$ toward each other until the lip $f'$ passes over the lower end of the latch C, the other extremity of said latch resting, as shown, in the angle of the bait-holder. As soon as a fish or animal displaces the holder by taking the bait, the latch C is liberated from engagement with the lip $f'$ of the dog F. The spring E now causes the disk B and ring $d^2$ to move apart, bringing the points of the hooks together, as shown in Fig. 3, and firmly securing the game or fish, which, in most instances, will be instantly killed and thereby prevented from enduring prolonged pain.

$A'$ is a ring by which the device may be hung from or secured to a tree, branch, or fishing-line, according to the circumstances under which it is employed.

What I claim as my invention is—

1. The combination, with the pivoted hooks $d$, connected to a snapping-spring, of a suitable bait-holder, latch, and dog, which will retain said spring and hooks when the trap is set, substantially as described.

2. The combination of shank A, disk B, latch C, crown D, hooks $d\ d$, spring E, dog F, and bait-holder G, the several parts being constructed and arranged for operation substantially as shown and described.

In testimony that I claim the foregoing I have hereunto set my hand this 11th day of August, 1876.

BENJN. F. SMITH.

Witnesses:
GEO. C. SHELMERDINE,
M. DANL. CONNOLLY.